United States Patent

[11] 3,614,781

[72] Inventor Samuel W. Lichtman
 Riverside, Calif.
[21] Appl. No. 567,037
[22] Filed Feb. 21, 1956
[45] Patented Oct. 19, 1971
[73] Assignee The United States of America as
 represented by the Secretary of the Navy

[54] DUAL CHANNEL DOPPLER FREQUENCY-SELECTIVE FUZE SYSTEM
 11 Claims, 10 Drawing Figs.
[52] U.S. Cl.................................................. 343/7 PF,
 102/70.2 P
[51] Int. Cl...................................................... G01s 7/02,
 F42c 13/04
[50] Field of Search...........................................343/7, 7 PF;
 102/70.2 P

[56] References Cited
 FOREIGN PATENTS
 147,133 7/1952 Australia...................... 102/70.2 P Primary Examiner—T. H. Tubbesing
Attorneys—G. J. Rubens and J. M. St. Amand ABSTRACT: A frequency-selective fuze system comprising means for transmitting an RF signal and receiving an echo signal modified by the doppler frequencies resulting from the relative velocity between a missile carrying the fuze and a target aircraft means for deriving the doppler frequency spectrum from said received signal, means for disassociating the spectrum into two spectral bands consisting of low frequency components of the doppler signal and high-frequency components of the doppler signal, and means for initiating a burst signal in response to a coincident combination of said low frequency components and a particular portion of said high-frequency components.

FIG. 1

INVENTOR.
S. W. LICHTMAN

FIG. 2

INVENTOR
S.W. LICHTMAN
ATTORNEYS

*INVENTOR.*
S. W. LICHTMAN

# DUAL CHANNEL DOPPLER FREQUENCY-SELECTIVE FUZE SYSTEM

This invention relates to a fuze system and more particularly to a dual channel doppler frequency-selective fuze system which provides improved resolution of target details for close in target recognition and particularly identification of the central region of the target aircraft.

The typical unmodulated CW-type of VT fuze responds to the gross features of the detected return signal. Such a response mechanism precludes the identification of target features that are necessary for obtaining optimum burst position. These prior fuzes improved the effectiveness of ordnance weapons by incorporating into them a target sensing capacity, however, there has been a need for some means of improving target resolution in order to obtain maximum damage from a given warhead, particularly for portions of the trajectory in the immediate vicinity of the target.

It has been found that the intact M-wave or close-in target return signal received as an echo from the target aircraft illuminated by unmodulated CW RF energy contains a spectrum of doppler frequencies which can be disassociated into a number of spectral frequency bands by means of wave filters. The system of the present invention utilizes the capabilities of frequency selection as a means for improving the identification of the central region of a target aircraft. Burst action is controlled by the coincident occurrence of two gating signals that are derived from separate channel networks made individually responsive to the low frequency and to the high frequency extremity regions of the doppler spectrum. The low-frequency components of the doppler signal increase in amplitude as the missile moves through the region located along side the target aircraft, since the low-frequency signal is largely the result of normal reflections from the target. The high-frequency signal is due to echoes from widely dispersed areas of the target and is characterized by the wave envelope configuration containing several interferencelike wave groups. These are usually found to maximize in the vicinity of the tail, center, and nose, respectively, of the target aircraft.

Essentially the method depends upon the formation of gating signals that correspond to the increasing amplitude regions of the high-frequency wave pattern. These high-frequency gates are used in conjunction with the gate that is derived from the low-frequency channel. As the low-frequency gate occurs abreast of the target and the three high-frequency gates occur (1) in the vicinity of the tail; (2) in the vicinity of target center, and (3) in the vicinity of the nose, a coincident combination of low-frequency and high-frequency gates initiates a burst signal starting with the second high-frequency-gating group in the central target area.

Successful isolation of the central high-frequency wave group is predicated upon preventing the occurrence of an early low-frequency gate. The low-frequency gate is premature if it either overlaps the gate associated with the first zone of the high-frequency wave region or is initiated by early and therefore undesirable low-frequency signals. The first of these difficulties is avoided by delaying the onset of the low-frequency-filtered wave through a process of blanking out the initial part of the wave to prevent overlapping and the second difficulty is resolved by utilizing amplitude discrimination for removing undesirably early low-level signals and thereby preventing them from setting off the low-frequency gate gate.

One object of the present invention is utilizing the signature trace information from an unmodulated continuous wave type of fuze system for improving resolution of target details for close in target recognition and particularly for identification of the central region of a target aircraft, or if desired the tail or nose portions of the aircraft.

Another object of the present invention is to provide a fuze system wherein burst action is controlled by the coincident occurrence of two gating signals that are derived from separate channel networks which are individually responsive to the low frequency and to the high frequency extremity regions of the doppler spectrum.

A still further object of the present invention is to provide a proximity fuze particularly adapted for use against aerial targets to obtain maximum damage by causing the burst to occur over a region close to the center of the target and wherein center resolution is approximately the same for both the head on and tail on approach of the missile.

Still another object of the present invention is to provide a fuze system which is useful over a wide range of approach velocities and over a wide range of amplitudes but is substantially amplitude independent in its operation.

A still further object of the present invention is to provide a dual channel doppler frequency-selective fuze system which will not operate prematurely when the low low-frequency portion of the spectrum overlaps the high-frequency portion of the spectrum associated with a remote portion of the aircraft and will not be initiated by early undesirable low-frequency signals which may occur before the missile is alongside the target aircraft.

Yet another object of the present invention is to provide a dual channel frequency-selective fuze system which causes the burst to occur in a central target area and also has an inherent capacity for inhibiting proximity fuze action and thereby making possible contact fuze point detonation operation, when on a normal approach collision course.

Other objects and many of the attendant advantages of this invention will be readily appreciated as the same becomes better understood by reference to the following detailed description when considered in connection with the accompanying drawings wherein:

Figure 3:
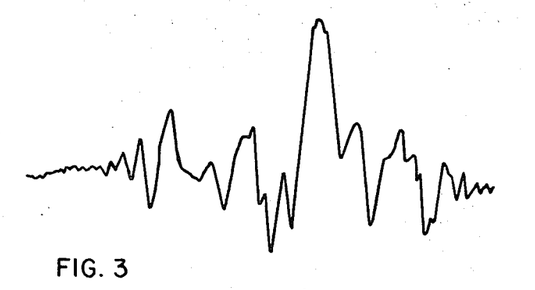
FIG. 3 is a graph representing the M-wave signature trace of a target aircraft.
Figure 4:
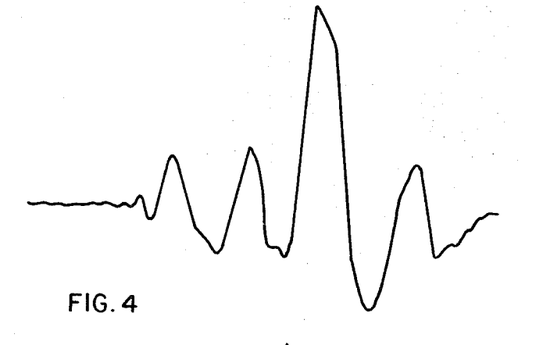
FIG. 4 is a graph representing the low-frequency component of the M-wave shown in FIG. 3.
Figure 5:
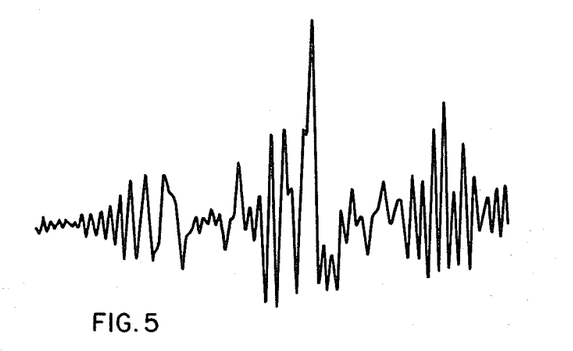
FIG. 5 is a graph representing the high-frequency component of the M-wave of FIG. 3.

Referring now to the drawings in detail and more particularly to FIGS. 3, 4, and 5 representing the intact M-wave or signature trace waveform of a target aircraft and the low-frequency and high-frequency components thereof respectively; a fuze system transmitting an unmodulated CW signal will receive and detect a gross signal such as that illustrated in FIG. 3, may be analyzed and reduced by wave filters to the components illustrated in FIGS. 4 and 5.

THEORY

When a fuzed missile and a target are in close proximity, different areas of the target are moving at different velocities relative to the missile. Specular and diffuse reflection of the radiation then act to produce a signal at the fuze detector output, which contains a spectrum of doppler frequencies.

Figure 6:
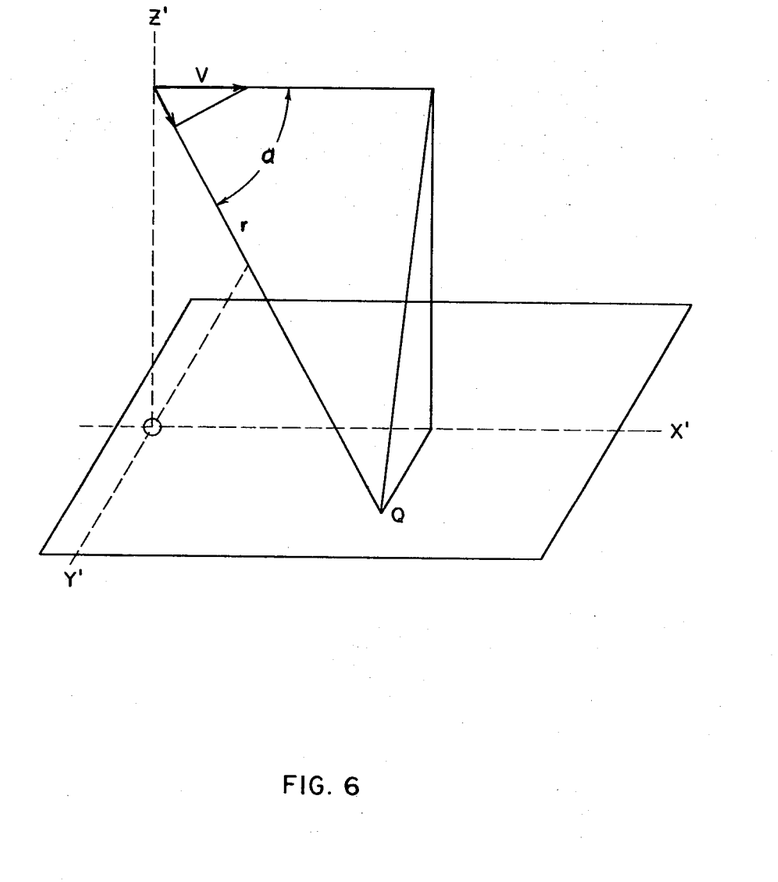
FIG. 6 is a diagram illustrating the air approach geometry.

Let the passage of a fuzed missile over a target be represented geometrically as in FIG. 6. The fuze is assumed to be firmly attached to the orthogonal reference frame $x'y'z'$ and to be displaced an amount $z'$ from the origin of coordinates. Consider the target as being stationary and to lie in the $x'y'$ plane and the fuze, together with its frame of reference, to move with velocity V in the $x'$ direction. The point Q is any reflecting center on the target, $r$ is the distance from the fuze to Q and $\alpha$ is the angle between $r$ and the fuze trajectory. From FIG. 6 were obtain $$\cos \alpha = x'/r, \quad (1)$$

and $$r = \sqrt{(x')^2 + (y')^2 + (z')^2}. \quad (2)$$

By substituting equation (2) into equation (1) and rearranging the terms we obtain $$(x')^2 \tan^2\alpha - (y')^2 = (z')^2. \quad (3)$$

For any horizontal plane ($z'$=constant), this equation represents a family of hyperbolas, each curve corresponding to a particular value of $\alpha$. A particular doppler frequency is given by $f_0 = f_d \cos \alpha$, where $f_d$ is the head-on doppler frequency. Defining $p$ as the ratio of the observed doppler frequency to the head-on doppler frequency, we may write $$\alpha = \cos^{-1} p. \quad (4)$$

Substituting this expression into equation (3), we obtain $$(x')^2 \tan^2(\cos^{-1} p) - (y')^2 = (z')^2. \quad (5)$$

Figure 7:
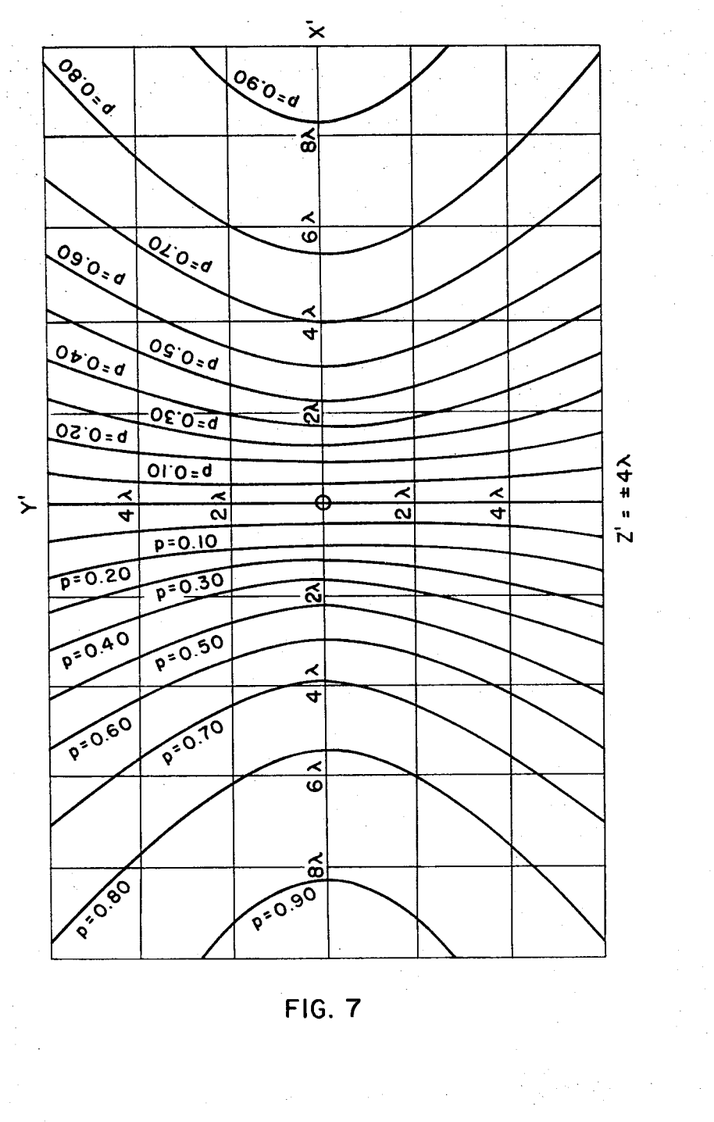
FIG. 7 is a diagram illustrating the spatial distribution of the doppler spectrum.

A plot of equation (5), showing the location of reflecting regions as a function of spectral frequency components for an impact parameter of 4λ, appears in FIG. 7. For the impact parameter chosen, FIG. 7 identifies the location of reflecting regions on a target in the $x'y'$ plane that are responsible for particular spectral terms.

In the oscillogram of FIG. 4, for example, the wave pattern obtained below 15 percent $f_d$ would be attributable to reflectors lying in the region between the two $p$=0.15 lines. Similarly, in the oscillogram of FIG. 5 for the high pass centered around 50 percent $f_d$ the wave pattern would be identified with reflecting regions lying beyond these respective lines.

DISCUSSION

The close-in target signature trace of FIG. 3 is a complex wave pattern containing a frequency spectrum of components returned from widely dispersed areas of the target surface. Analysis of the signature trace by means of a wave filter furnishes evidence for the isolation of components of the wave affiliated with definite regions of the target surface.

The lowest frequency component is attributable to normal reflections from the target (i.e., for perpendicular incidence) and as such contains most of the wave energy. As this spectral region is caused by normal reflections, it is found to be constrained to the region within the target extremities.

The high-frequency wave components, from the theory that has been presented, represent echoes from the extremities of the target. Selection of spectral components centered in a band not less than 50 percent $f_d$ usually results in the appearance of three wave groups with maxima occurring near the tail, center, and nose positions of the target as in FIG. 5. For some of the trajectories the tail apparently does not intercept a sufficient amount of the radiation to produce a well defined wave pattern, but the center wave group is present in all cases.

CIRCUIT DESCRIPTION

Figure 1:
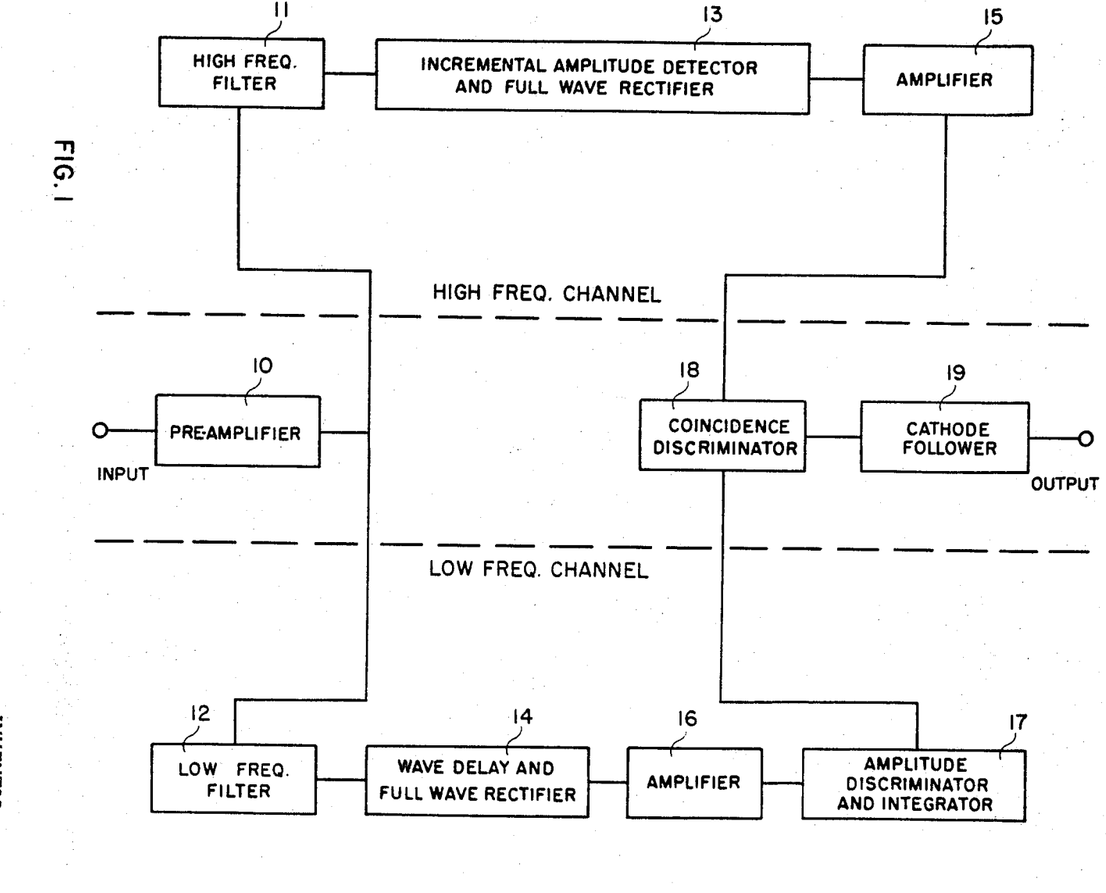
FIG. 1 is a block diagram illustrating one preferred embodiment of apparatus for implementing the dual channel frequency selective fuze system of the present invention.
Figure 2:
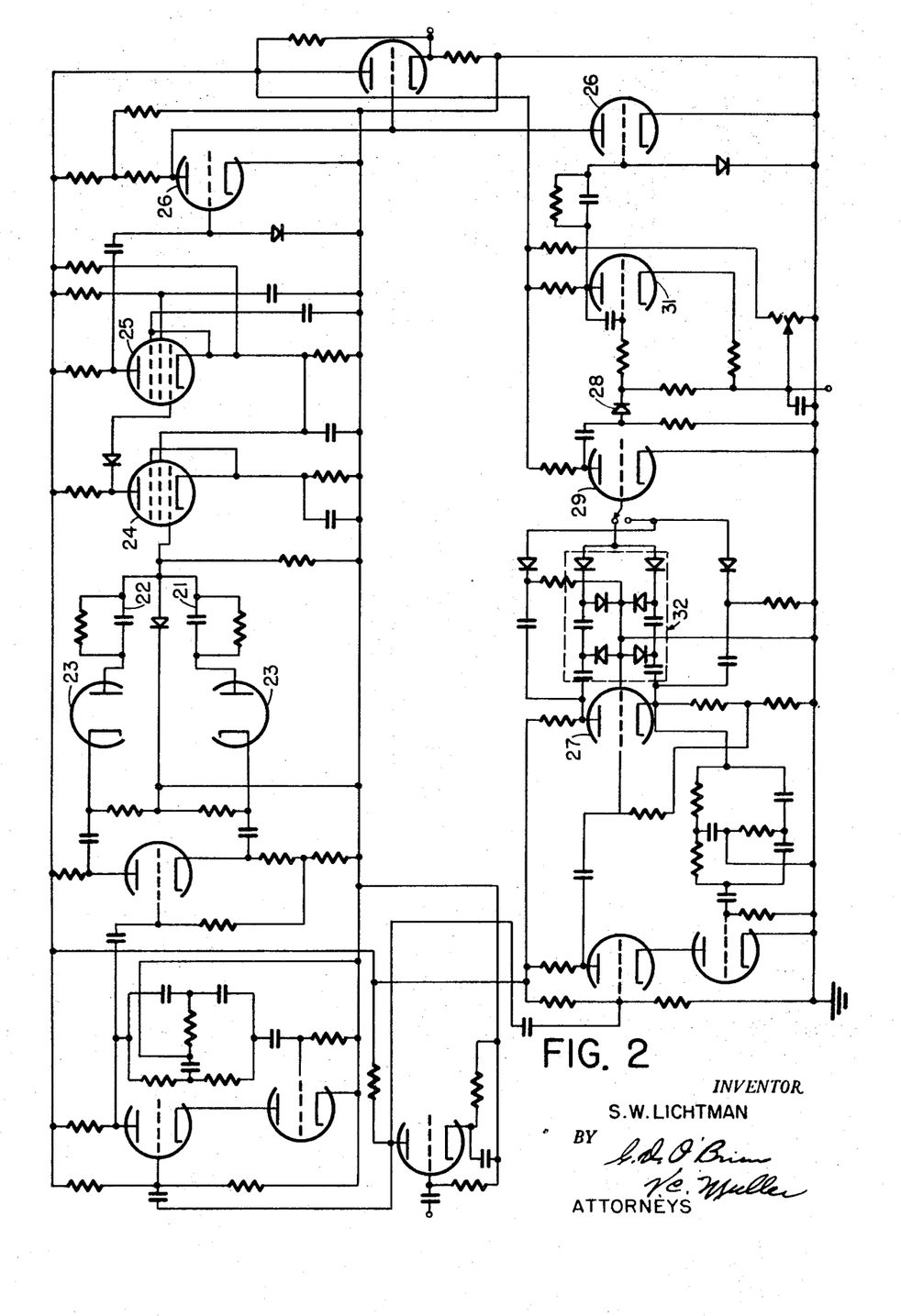
FIG. 2 is a schematic diagram of the dual channel frequency selective fuze system illustrated in FIG. 1.

Block and schematic wiring diagrams illustrating one preferred embodiment of the frequency-selective fuze system are shown in FIGS. 1 and 2. It may be possible to simplify the circuit and develop a system more suitable for a small fuze package.

The doppler signal, is first amplified in preamplifier 10 and is then diverted into HF- and LF-gating channels. Upon entering each channel, the doppler signal is restricted to a suitable frequency band by means of the tuned filters 11 and 12. Resonant frequencies are chosen consistent with the theory supra so as to enable the LF gate to occur at a frequency band centered around 5 percent $f_d$ and the HF gate to be centered in a band not less than 50 percent $f_d$, where $f_d$ is the head-on doppler frequency corresponding to the average anticipated approach velocity.

The frequency filters 11 and 12 used in each channel are active networks, each comprising a cascode amplifier with a twin-T network ranged in a degenerative feedback loop.

The respective filtered signal components are rectified in circuits 13 and 14 and transformed into suitable gates through amplifiers 15 and 16 and amplitude discriminator 17 for controlling the operation of a coincidence discriminator 18. A cathode follower 19 finally couples the burst signal, as developed by the coincidence stage, to the output terminals.

Figure 8:
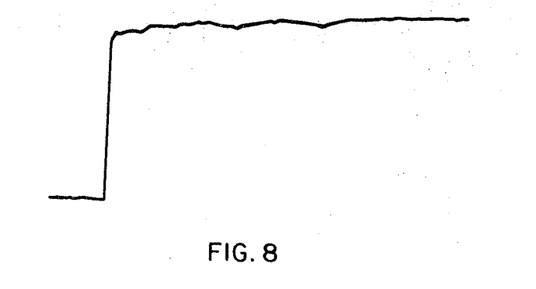
FIG. 8 is a graph representing the low-frequency gate developed in the apparatus of FIGS. 1 and 2.
Figure 9:
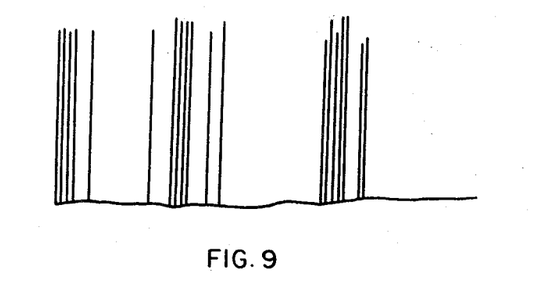
FIG. 9 is a graph representing the high-frequency gate developed in the apparatus of FIGS. 1 and 2.
Figure 10:
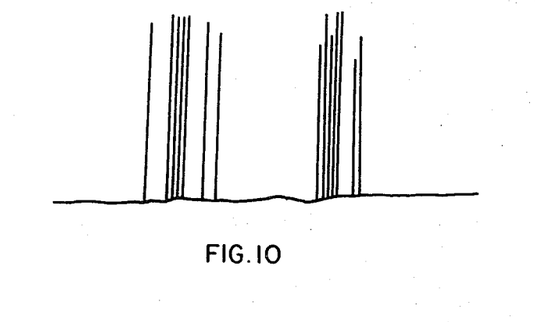
FIG. 10 is a graph representing the coincidence signal from the apparatus shown in FIGS. 1 and 2.

FIGS. 3, 4 and 5 illustrate the decomposition of the original M-wave into LF and HF components, and FIGS. 8 and 9 illustrate the formation of gating signals from these, and finally FIG. 10 illustrates the burst signal resulting from the coincidence of the gates.

The operation of the fuze system as illustrated in the schematic diagram of FIG. 2 requires that the HF doppler component produce gating signals coinciding with the increasing amplitude regions of the filtered wave. This gating action is accomplished by choosing capacitive loads 21 and 22 for use with rectifier tube 23 and arranging the circuit to provide a short time constant for charging and a considerably longer time constant for discharging. By this means the load capacitors tend to charge to the crest value of the impressed voltage waveform. Charging currents, which occur only over the increasing amplitude regions of the filtered wave, are then amplified through tubes 24 and 25 to form the necessary HF gate. This gating signal serves to control the grid element of one-half of tube 26 forming part of the coincidence discriminator circuit 18.

The purpose of the LF channel is to provide a gating signal in the region following the leading edge of the target, that is, over that portion of the flight trajectory situated alongside the target.

The LF filtered wave is rectified and its onset is delayed by means of tube 27 and the circuitry following it. Undesirable low-amplitude components occurring early in the unidirectional wave are then removed by means of the biased diode 28 which follows the saturating amplifier tube 29. The resultant signal is amplified and integrated in tube 31 to further discriminate against weak signals and to sustain the gate when once started. The amplified and integrated gating signal is finally impressed upon the control element of the other half of tube 26 in the coincidence discriminator circuit 18.

The first part of the LF signal must be blanked out to prevent the occurrence of an early gate. The method consists in utilizing the peak voltage clamping characteristics of a series diode capacitance circuit arrangement 32. Such a circuit, commonly known as a DC restorer, produces no output until the capacitance has charged to the peak signal value in the forward direction of the diode. Following such an interval, the wave reappears riding along the peak level as a new axis. A single restorer stage will delay the wave by as much as one-half period. Additional stages may be connected in cascade to provide further delay, or other delay means may be utilized, if desired.

In the schematic diagram, FIG. 2, a two-section wave-delay network is shown following the push-pull driver tube 27. This yields a full-wave rectified signal delayed from the start of the LF wave by about three-fourths wave period, regardless of the wave frequency or pass velocity.

The coincidence discriminator consists of tube 26 with each half sharing a large common plate-load resistance. Grid elements of each tube section are operated without bias. The result of this arrangement is a very low plate voltage when either or both tubes are conducting. However, when both tubes are cut off by the simultaneous application of negative polarity gating signals to their respective grids, the plate voltage rises to the supply potential and a large output signal of burst magnitude is produced. The choice of a large common plate resistance in combination with a small plate supply potential results in high-cutoff signal sensitivity, together with strong rejection of feed-through signals due to cutoff operation of either section.

Satisfactory operation of this system requires that the signal be of sufficient amplitude to saturate both gating circuits. At the same time, the amplitude discriminator bias level must be adjusted to reject the strongest anticipated LF component that may occur before the target is reached.

OPERATION

The frequency-selective fuze system dissociates the M-wave signature trace into two spectral bands by means of wave filters. These bands are chosen near the frequency extremities of the doppler spectrum in accordance with principles set forth in the theory supra. Gating signals derived from both channels act to control the coincidence discriminator 18 that establishes the burst signal.

The low-frequency (LF) components of the doppler signal increase in amplitude as the missile moves through the region located alongside the target aircraft. On the basis of the theory supra the low-frequency signal is largely the result of normal reflections from the target.

The high-frequency (HF) signal is due to echoes from widely dispersed areas of the target and is characterized by a wave-envelope configuration containing several interference-like wave groups. These are usually found to maximize in the vicinity of the tail, center, and nose, respectively, of the target aircraft.

Essentially the method depends upon the formation of gating signals that correspond to the increasing amplitude regions of the HF wave pattern. These HF gates are used in conjunction with a gate that is derived from the LF channel. As the LF gate occurs abreast of the target and the three HF gates occur (1) ahead of the target, (2) in the vicinity of target center, and (3) in the vicinity of the nose, a coincident combination of LF and HF gates initiates a burst signal starting with the second HF gating group, in the central target area.

Successful isolation of the central HF wave group is predicted upon preventing the occurrence of an early LF gate. The LF gate is premature if it either (a) overlaps the gate associated with the early zone of the HF wave region, or (b) is initiated by early, and therefore undesirable LF signals.

The first of these difficulties has been avoided by delaying the onset of the LF filtered wave through a process of blanking out the initial part of the wave to prevent overlapping. This delays the subsequent LF gate along the wave. Delay along the wave is preferable to time delay. With wave delay, burst position relationships along the target are preserved regardless of the approach velocity, as is necessary in this system for achieving an unambiguous identification of the major areas of a target aircraft. The use of a fixed time delay would prevent such performance by causing the burst position to be velocity dependent.

The second difficulty has been resolved by recognizing that early LF signal components are usually lower in amplitude by a factor of at least four than the signal returned in the useful region of the target. Consequently, amplitude discrimination has been used for removing undesirably early, low-level signals, and thereby preventing these from setting off the LF gate.

The majority of bursts occur ahead of target center and are confined to a region extending from approximately 30 feet ahead of center to target center.

The method used has proven useful over a wide range in approach velocities and over an amplitude range limited by the ratio of useful to undesirable signal amplitudes in the LF doppler spectrum.

Target center resolution remains about the same whether an approach is made head-on or tail-on.

Through slight variations of the circuits disclosed in the preferred embodiment herein, the fuze can be made to identify and trigger on the portion of the signal corresponding to the tail or nose portion of the target aircraft rather than the center. This may be accomplished largely independent of the approach heading or the approach velocity.

A collision course normal to the reflecting surface of the target may be expected to prevent LF gate functioning by excluding the formation of low-frequency doppler components. The dual channel frequency selective fuze system therefore embodies an inherent capacity for inhibiting proximity fuze action and thereby makes possible contact fuze point detonation operation, when on a normal approach collision course. This invention in a simpler form is disclosed in the copending application of D. J. Adrian and S. W. Lichtman, Ser. No. 565,746, filed Feb. 15, 1956.

Obviously many modifications and variations of the present invention are possible in the light of the above teachings. It is therefore to be understood that within the scope of the appended claims the invention may be practiced otherwise than as specifically described.

What is claimed is:

1. A frequency-selective fuze system comprising means for transmitting an RF signal and receiving an echo signal modified by the doppler frequencies resulting from the relative velocity between a missile carrying the fuze and a target aircraft, means for deriving the doppler frequency spectrum from said received signal, means for disassociating the spectrum into two spectral bands consisting of low-frequency components of the doppler signal and high-frequency components of the doppler signal, and means for initiating a burst signal in response to a coincident combination of said low-frequency components and a particular portion of said high-frequency components.

2. A system as set forth in claim 1 wherein means is provided for preventing the occurrence of an early low frequency gate.

3. A system as set forth in claim 1 wherein means is provided for selecting one of the wave groups in the high-frequency band.

4. A system as set forth in claim 1 wherein means is provided for delaying the onset of the low-frequency filtered wave by blanking out the initial part of the wave to prevent overlapping of the low-frequency gate with an undesired portion of the high-frequency gate, and means for amplitude discrimination to remove undesirable early low-level signals in the low-frequency range.

5. A frequency-selective fuze system comprising means for transmitting an RF signal and receiving an echo signal modified by the doppler frequencies constituting the signature trace of a target aircraft, means for deriving the doppler frequency spectrum from said received signal, means for disassociating the spectrum into two spectral bands consisting of low-frequency components of the doppler signal and high-frequency components of the doppler signal, means for forming gating signals in response to the low-frequency wave pattern and to one of the increasing amplitude regions of the high frequency wave pattern, and means for initiating a burst signal in response to a coincident combination of the low-frequency and high-frequency gates.

6. A system as set forth in claim 5 wherein means is provided for preventing the occurrence of an early low-frequency gate.

7. A system as set forth in claim 5 wherein means is provided for delaying the onset of the low frequency filtered wave by blanking out the initial part of the wave to prevent overlapping of the low frequency gate with an undesired portion of the high frequency gate, and means for amplitude discrimination to remove undesirable early low-level signals in the low frequency range.

8. A frequency-selective fuze system comprising means for transmitting an unmodulated continuous wave RF signal and receiving an echo signal modified by the doppler frequencies constituting the signature trace of a target aircraft, means for deriving the doppler frequency spectrum from said received signal, means for disassociating the spectrum into two spectral bands consisting of low-frequency components of the doppler signal and high-frequency components of the doppler signal, means for forming gating signals in response to the low-frequency wave pattern and to one of the increasing amplitude regions of the high-frequency wave pattern, and means for initiating a burst signal in response to a coincident combination of the low-frequency and high-frequency gates.

9. A system as set forth in claim 8 wherein means is provided for preventing the occurrence of an early low-frequency gate.

10. A system as set forth in claim 1 wherein means is provided for delaying the onset of the low-frequency filtered wave by blanking out the initial part of the wave to prevent overlapping of the low-frequency gate with an undesired portion of the high-frequency gate, and means for amplitude discrimination to remove undesirable early low-level signals in the low-frequency range.

11. A frequency-selective fuze system comprising means for transmitting an unmodulated continuous wave RF signal and receiving an echo signal modified by the doppler frequencies constituting the signature trace of a target aircraft, means for deriving the doppler frequency spectrum from said received signal, means for disassociating the spectrum into two spectral bands consisting of low frequency components of the doppler signal and high-frequency components of the doppler signal, means for forming gating signals in response to a desired portion and amplitude of the low-frequency wave pattern and to a desired portion of the high-frequency wave pattern, and means for initiating a burst signal in response to a coincident combination of the low-frequency and high-frequency gates.